United States Patent
Huang et al.

(10) Patent No.: US 7,603,468 B2
(45) Date of Patent: Oct. 13, 2009

(54) HOME ADAPTIVE TRANSCEIVER FOR HOME NETWORKING COMMUNICATION SYSTEM

(75) Inventors: Gang Huang, Highlands, NJ (US); Zhenyu Wang, Morganville, NJ (US); Jinguo Yu, Manalapan, NJ (US)

(73) Assignee: Agere Systems, Inc., Allentown, PA (US)

( * ) Notice: Subject to any disclaimer, the term of this patent is extended or adjusted under 35 U.S.C. 154(b) by 692 days.

(21) Appl. No.: 10/043,143

(22) Filed: Jan. 14, 2002

(65) Prior Publication Data

US 2003/0135637 A1    Jul. 17, 2003

(51) Int. Cl.
G06F 15/177 (2006.01)
G06F 15/173 (2006.01)
G06F 15/16 (2006.01)

(52) U.S. Cl. .................. 709/229; 709/220; 709/224; 709/228

(58) Field of Classification Search .......... 709/227, 709/230, 232, 220–224, 228–229; 370/254, 370/255; 379/26.01, 1.01, 22.01, 1.03
See application file for complete search history.

(56) References Cited

U.S. PATENT DOCUMENTS

| | | | |
|---|---|---|---|
| 6,009,553 A * | 12/1999 | Martinez et al. | 714/784 |
| 6,272,353 B1 * | 8/2001 | Dicker et al. | 455/517 |
| 6,424,630 B1 * | 7/2002 | Ang | 370/251 |
| 6,456,652 B1 * | 9/2002 | Kim et al. | 375/224 |
| 6,470,074 B2 * | 10/2002 | Teixeria | 379/32.04 |
| 6,493,320 B1 * | 12/2002 | Schober et al. | 370/241 |
| 6,570,915 B1 * | 5/2003 | Sweitzer et al. | 375/225 |
| 6,587,875 B1 * | 7/2003 | Ogus | 709/223 |
| 6,601,009 B2 * | 7/2003 | Florschuetz | 702/124 |
| 6,704,351 B1 * | 3/2004 | Ott et al. | 375/222 |
| 6,724,890 B1 * | 4/2004 | Bareis | 379/394 |
| 6,882,634 B2 * | 4/2005 | Bagchi et al. | 370/338 |
| 7,218,605 B2 * | 5/2007 | Ochiai et al. | 370/216 |
| 2002/0118649 A1 * | 8/2002 | Farley et al. | 370/252 |
| 2003/0086515 A1 * | 5/2003 | Trans et al. | 375/346 |

OTHER PUBLICATIONS

International Telecommunication Union Recommendation G.989.1; Feb. 2001.*
International Telecommunication Union Recommendation G.989.2; Nov. 2001.*
International Telecommunication Union Recommendation G.989.3; Mar. 2003.*
Feuser et al.; On the Effects of the IEEE 802.3x Flow Control in FUII-Duplex Ethernet LANs; 1999.*

* cited by examiner

Primary Examiner—Aaron Strange

(57) ABSTRACT

A self calibrating network comprises a first node and a second node. The first node transmits a calibration data packet. The second node receives the calibration data packet and determines a calibration value for the second node to optimize the transfer of data from the first node to the second node.

6 Claims, 5 Drawing Sheets

HOME ADAPTIVE TRANSCEIVER FOR HOME NETWORKING COMMUNICATION SYSTEM

BACKGROUND OF THE INVENTION

1. Field of the Invention

This invention relates generally to networking computers within a small environment such as a home. More particularly, it relates to a home networking communication system using an adaptive transceiver.

2. Background of Related Art

Home networking systems provide local area network (LAN) solutions for home and/or small business using a telephone line.

FIG. 4 illustrates a conventional star network.

In particular, FIG. 4 illustrates a topology conventionally known as a star network. A star network is one in which network devices or network nodes 310, 320, 330, 340 and 350 are connected to a central computer 360 in a star-shaped configuration.

Messages in a star network pass from any of the network nodes 310, 320, 330, 340 and 350, to the central computer 360. The central computer 360 examines a destination address attached to each message, and directs the message to the appropriate network node 310, 320, 330, 340 or 350. The central computer 360 also acts as a network node and directs its own messages to any of the satellite nodes 310, 320, 330, 340 and 350.

FIG. 5 illustrates a conventional ring network.

In particular, FIG. 5 illustrates a topology conventionally known as a ring network. A ring network is one in which network devices or network nodes 410, 420, 430 and 440 are connected in a closed loop, or ring by paths 415, 425, 435, and 445.

Messages in a ring network pass around the ring from network node to network node in one direction, e.g., from network node 410 to network node 420 over path 415, from network node 420 to network node 430 over path 425, from network node 430 to network node 440 over path 435, and back to the first network node 410 over path 445. When a network node 410 receives a message, it examines the destination address attached to the message. If the address is the same as that node's, the node 410 will accept the message. Otherwise, that network node 410 will regenerate the network message and pass it along to the next network node 420 in the given direction along the ring.

Star networks are subject an entire network failure if the central computer malfunctions. Satellite node malfunctions are less severe in this type of network, as any particular node will not typically have a negative affect on the remaining devices in the star network. Adding network nodes to a star network is simplified because it requires a new path only between the new network node and the central computer.

The performance of home networking transceivers mainly depends on the channel properties and noise environment, both of which vary from home to home. Channel properties are determined by the topology of the telephone line wiring, the condition of the telephone line and/or the types and number of devices connected to the telephone line. For instance, different devices connected on a particular telephone line will cause different echoes, different losses and/or different distortions to signals thereon.

Different homes have different wiring systems for phone lines, making the topology of a phone line network and line conditions completely different from home to home. These variations make it almost impossible to design a unique transceiver that is a best fit to all homes or small businesses.

SUMMARY OF THE INVENTION

In accordance with the principles of the present invention, a self calibrating network comprises a first node and a second node. The first node transmits a calibration data packet. The second node receives the calibration data packet and determines a calibration value for the second node to optimize the transfer of data from the first node to the second node.

A method for self calibrating a network in accordance with another aspect of the present invention comprises transmitting a calibration data packet from a first node. The calibration data packet is received by a second node and used in determining a calibration value for the second node to optimize the transfer of data from the first node to the second node.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides a method and apparatus for adjusting the properties of a home network transceiver device based on the particular needs of a given installation to optimize data bandwidth. In accordance with the principles of the present invention, a transceiver optimizes its transmissions with other transceivers through a training signal and procedure.

Figure 1:
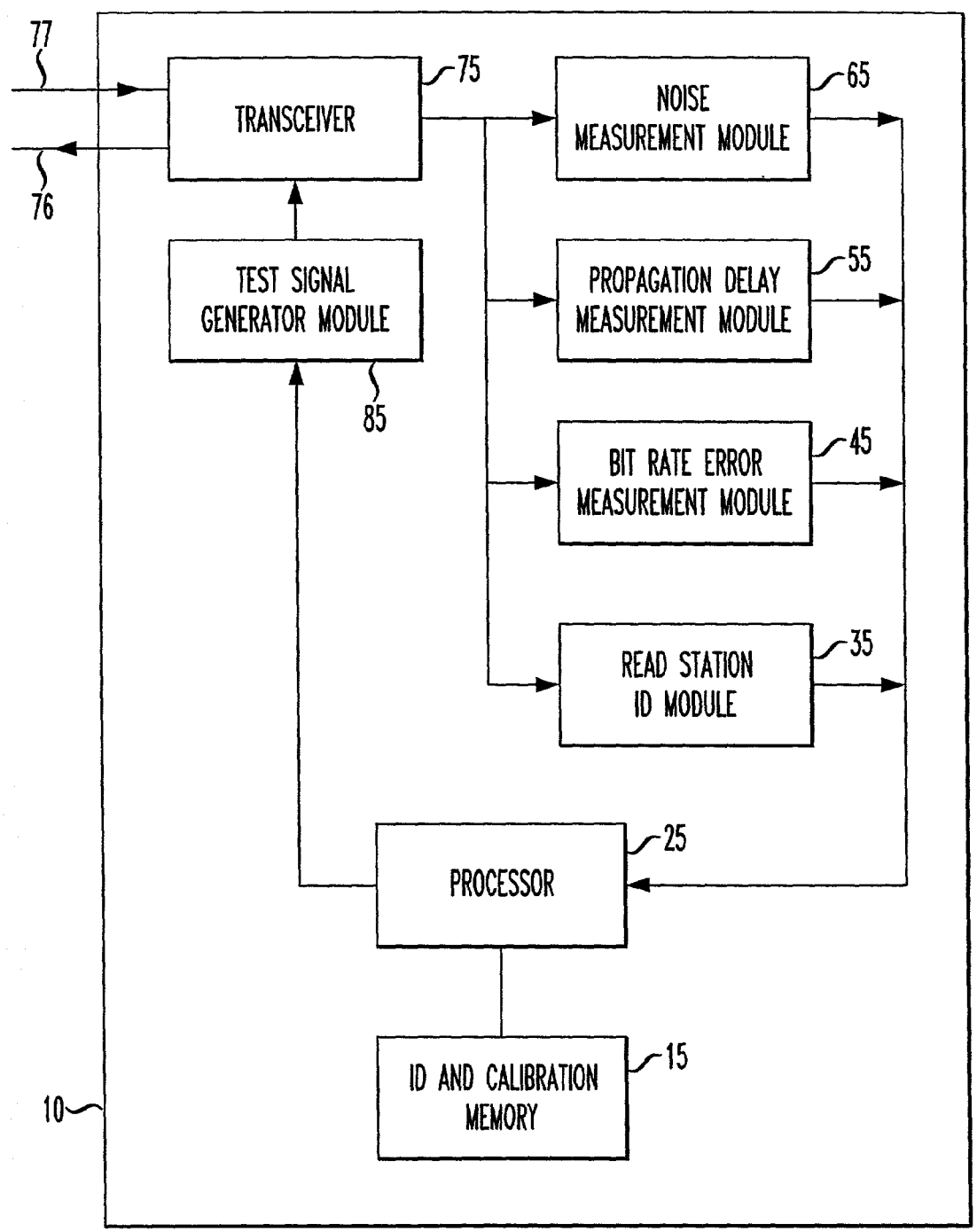
FIG. 1 shows a self-learning and self-adjusting home network transceiver, in accordance with the principles of the present invention.

FIG. 1 shows a first embodiment in accordance with the principles of the present invention. FIG. 1 shows a home network transceiver that is self-learning and self-adjusting to optimize its communication performance with other home network transceivers.

In particular, FIG. 1 shows a home network transceiver 10 comprising a transceiver 75, a noise measurement module 65, a propagation delay measurement module 55, a bit rate error measurement module 45, a read station ID module 35, a processor 25, an ID and calibration memory 15, and a test signal generator module 85.

In operation, test signal generator module 85 initially generates a pre-established default test signal. The pre-established default test signal is transferred to transceiver 75. Transceiver 75 transmits the pre-established default test signal to a second home network transceiver over communication link 76.

The second home network transceiver returns the pre-established default test signal to home network transceiver 10 over communication link 77. Transceiver 75 communicates the pre-established default test signal to each of the noise measurement module 65, the propagation delay measurement module 55, the bit rate error measurement module 45, and the read station ID module 35.

Noise measurement module 65 analyzes the pre-established default test signal returned from the second home network transceiver and communicates a noise measurement value to processor 25.

Propagation delay measurement module 55 analyzes the pre-established default test signal returned from the second home network transceiver and communicates a propagation delay value to processor 25.

Bit rate error measurement module 45 analyzes the pre-established default test signal returned from the second home network transceiver and communicates a bit rate error value to processor 25.

Read station ID module 35 analyzes the pre-established default test signal returned from the second home network transceiver and communicates a station ID value of the second home network tranceiver to processor 25.

Processor 25 receives the noise measurement value, propagation delay value, bit rate error value, and a station ID value. Processor analyzes the the noise measurement value, propagation delay value, and bit rate error value respectively received from modules 45, 55 and 65 and stores an initial calibration value associated with the received ID in ID and calibration memory 15.

Processor 25, after having analyzed the noise measurement value, propagation delay value, and bit rate error value, determines whether any of the values are outside of an acceptable range. If any of the values are outside of an optimized range, processor 25 instructs test signal generator module 85 to create a new test signal. The new test signal incrementally changes the transmission properties of home network transceiver 10 to try and improve communication properties between home network transceiver 10 and a second home network transceiver.

The new test signal is transmitted from home network transceiver 10 to a second home network transceiver, as described above for the pre-established default test signal. The new test signal is transmitted back to the home network transceiver 10, where the new test signal is analyzed to again determine the communication characteristics between home network transceiver 10 and a second home network transceiver.

Processor 25 compares the noise measurement value, propagation delay value, and bit rate error value respectively returned from modules 45, 55 and 65 relative to the new test signal with the values initially stored from analysis of the pre-established default test signal. If any of the values produced by modules 45, 55 and 65 indicate a loss in communication quality between the home network transceiver 10 and a second home network transceiver, processor 25 does not store the configuration producing a loss of quality for that particular ID.

If processor 25 compares the values returned from modules 45, 55 and 65 relative to the new test signal with the values initially stored from analysis of the pre-established default test signal and determines a greater reliability in communication between home network transceiver 10 and a second home network transceiver, a new calibration value is stored in ID and calibration memory 15 associated with a second home network transceiver having that particular ID.

Processor 25 analyzes test signals generated by test signal generator 85 and incrementally changes the signal generated by the test signal generator 85. All possible combinations of testing parameters are used to create numerous test signals that assure that the signal quality received by transceiver 75 from a second home network transceiver is of the highest quality available based on such transmission characteristics as noise, propagation delay, and bit rate, the process ends for that particular ID.

The processor 25 initiates the calibration procedure for all the home network transceivers connected to the home network. Once all the home network transceivers within the home network have been calibrated, each has the ability to communicate with one another with optimized individualized calibration values for their respective transceivers, thus optimizing communication for any particular environment the home network transceiver is used in.

Although the exemplary embodiment shown in FIG. 1 discloses individual modules performing the functions of home network transceiver 10, the functions may be consolidated into fewer modules without affecting the function of the invention.

Although the exemplary embodiment shown in FIG. 1 discloses individual modules performing the functions of home network transceiver 10, many of the functions may be performed through software executed by processor 25 without affecting the function of the invention.

Although the exemplary embodiment shown in FIG. 1 discloses a home network transceiver 10 utilizing a transceiver 75 having two communication paths 76 and 77, the invention is applicable to home network transceivers using any type of transceiver, e.g., wireless transceiver, fiber optic transceiver, co-axial transceiver, phone line transceiver, etc.

Figure 2:
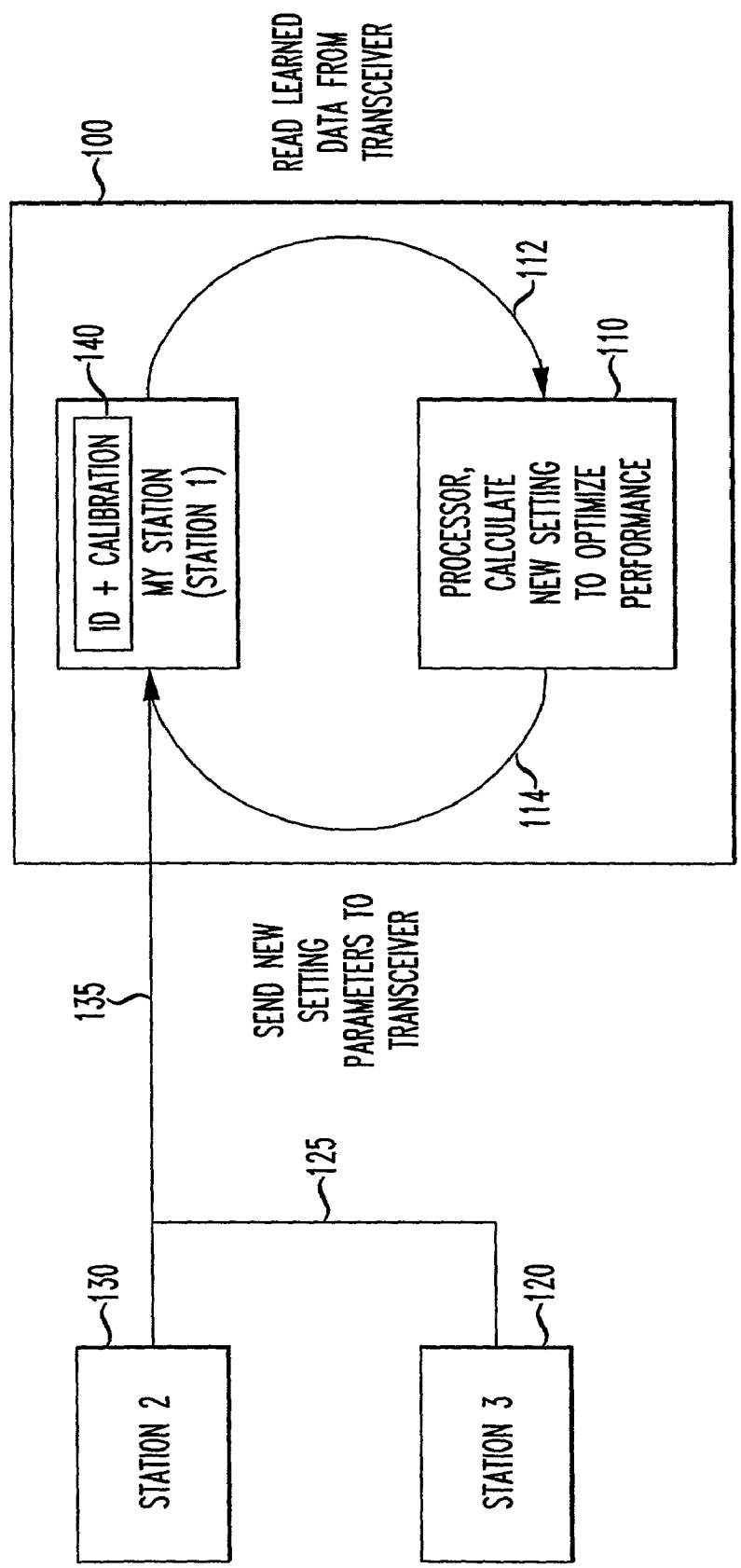
FIG. 2 shows a self-learning and self-adjusting network of home network transceivers, in accordance with the principles of the present invention.

FIG. 2 shows a second embodiment in accordance with the principles of the present invention. FIG. 2 shows a home network transceiver connected to other transceivers that is self-learning and self-adjusting to optimize its communication performance with the other transceivers.

In particular, FIG. 2 shows node 100 connected to two other nodes, node 120 and node 130. Transmission line 135 connects node 100 with node 120 and node 130. Transmission line 125 connects node 120 to node 100 and 130. Communication lines 112 and 114 connects node 100 with processor 110, for respectively sending and receiving data. A calibration memory 140 within node 100 stores calibration values associated with a particular node identification (ID).

Although the exemplary embodiment shown in FIG. 2 discloses the connection of three nodes, the actual number of nodes that are connectable within the network is limited only by the hardware used to connect the nodes and the number of actual nodes. In addition, although processor 110 shown in FIG. 2 is external to node 100 within the network, the processor can be incorporated within node 100 without affecting the function of the invention.

In operation, node 100 communicates with either node 120 or node 130 over transmission line 130 and transmission line 125. At any specific time, only one pair of stations communicate, one for transmitting and the other for receiving.

Beginning with either node 120 or node 130, one of the two nodes transmits a test signal to node 100. Exemplary, using node 130 as the first node to be calibrated with node 100, a test signal is transmitted by node 130 to node 100. Node 100 receives a node ID value indicating the origin of the communication signal and a test signal within the received calibration data packet.

Station 100 communicates the test signal received within the calibration data packet from node 130 to processor 110 over communication line 112. Processor 110 then analysis the properties of the test signal, e.g., noise within the signal, the propagation delay between the nodes, error rate within the bit pattern, etc. The analysis produces a calibration value that is communicated back to node 100 over communication line 114.

The calibration value received by node 100 from processor 110 is stored in calibration memory 140. This calibration value is used to adjust the transceiver's properties to optimize the transmission and reception of data to and from node 130.

A test signal is sent by each of the remaining nodes 100 and 120 to the other within the network to likewise calibrate node 120 and node 130 within the network, as calibration of node 100 was described above. In this manner, all the nodes within the network are calibrated for optimum performance with each other communicating node.

Although the preferred embodiment describes optimizing each node within the network for optimum performance with each other node within the network, one calibration value can be used within a particular node for communication with multiple nodes. The use of one calibration value is a compromise for most of the nodes within the network, however, one calibration value simplifies communication within the network by not having to switch between calibration values based on the particular node being communicated with at any given time.

Figure 3:
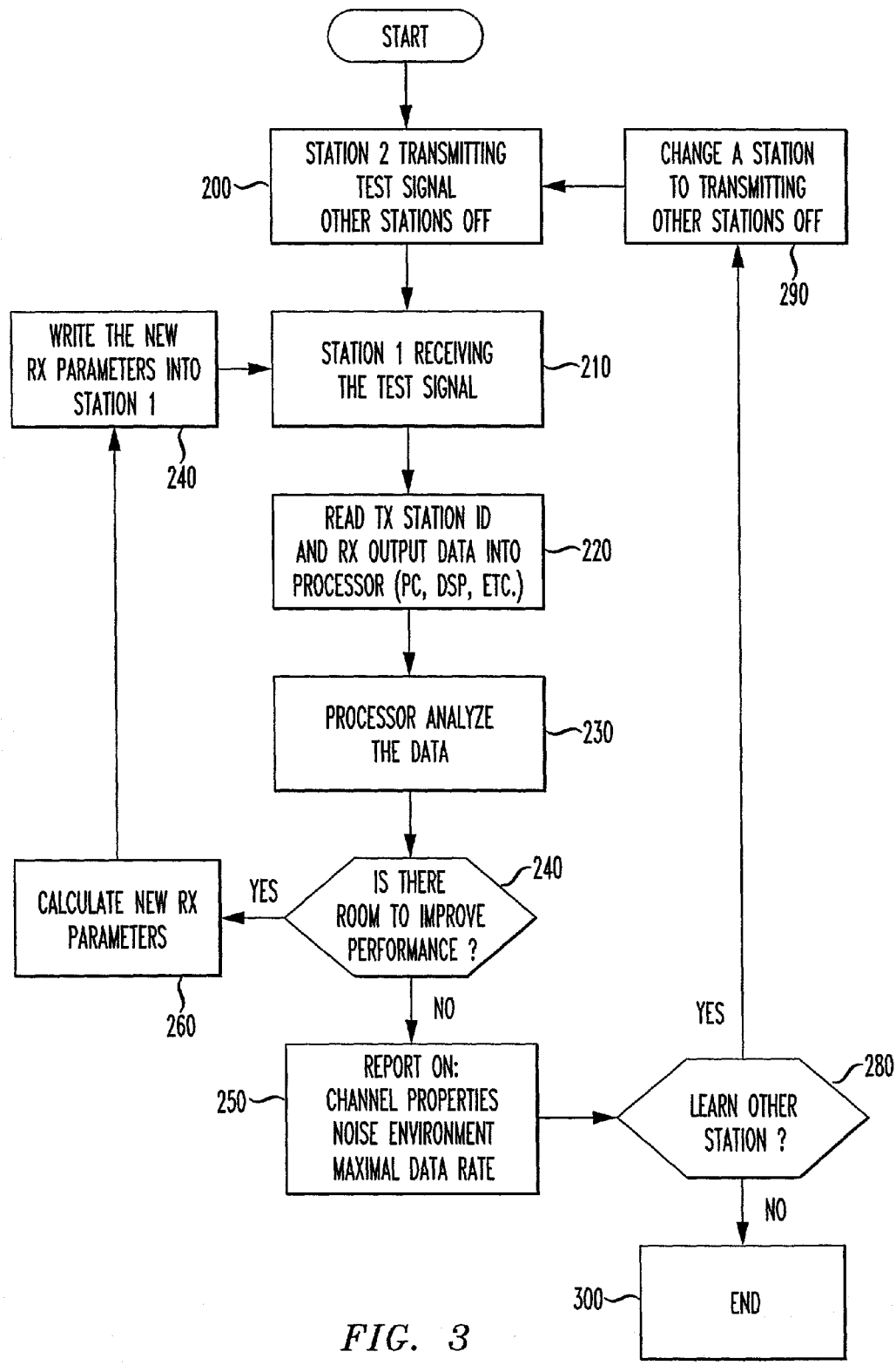
FIG. 3 is a flow chart illustrating an exemplary process of channel learning and optimizing a home network, in accordance with the principles of the present invention.
Figure 4:
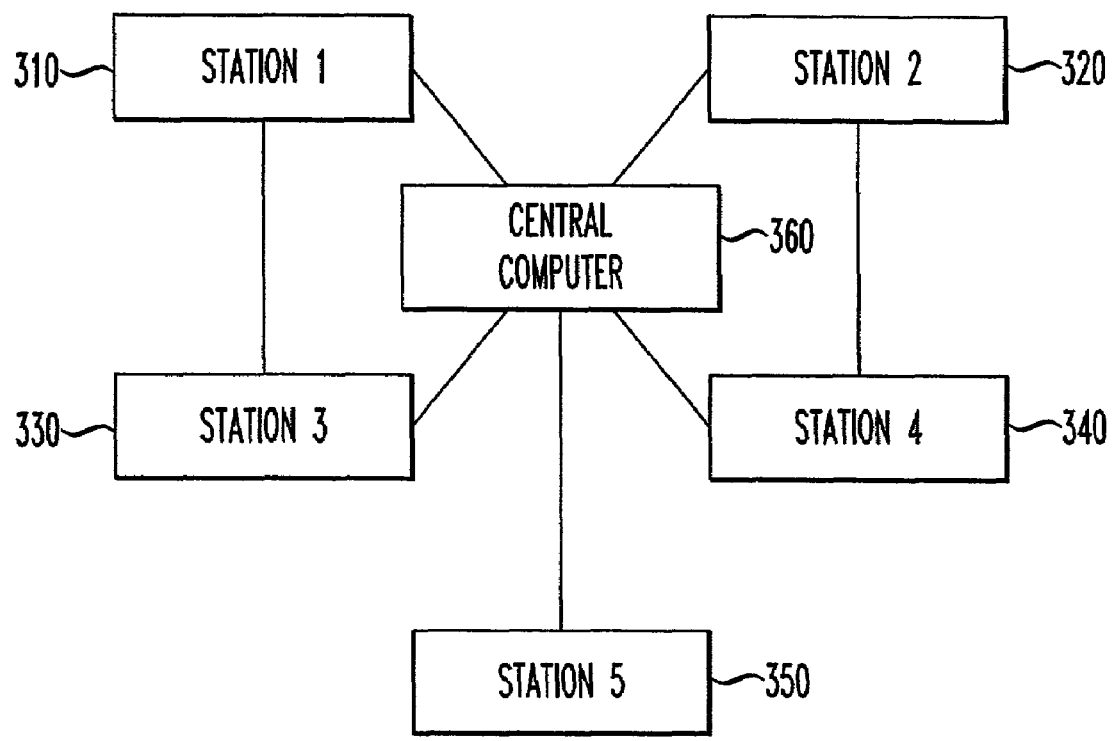
FIG. 4 shows a conventional star network.
Figure 5:
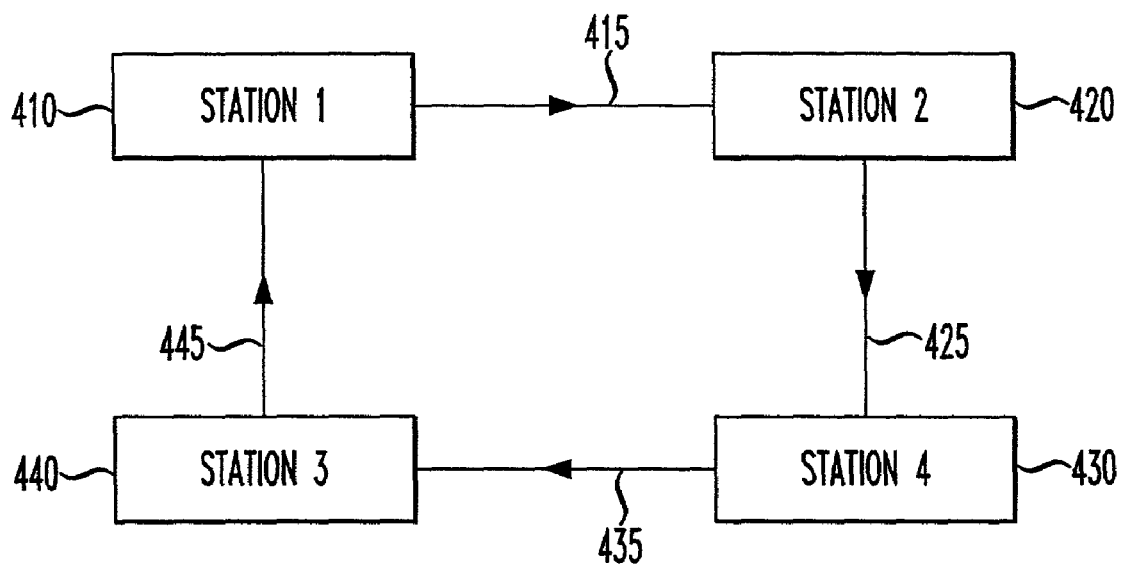
FIG. 5 shows a conventional ring network.

FIG. 3 shows a method for calibrating a node's operation within respect to other nodes within a network for optimum performance.

FIG. 3 describes node 130 transmitting its node ID and calibration data packet to node 100, as shown in FIG. 2. The method described in FIG. 3 in relation to node 100 and node 130 is exemplary for the transmission and reception of a calibration data packet used for calibration of all the nodes within the network of FIG. 2.

In step 200, a calibration data packet is transmitted by node 130 while no other nodes are transmitting data on the network.

To prevent other nodes on the network from transmitting during the calibration process, a network lock is issued by the node initiating the calibration data packet. The network lock prevents other nodes from trying to gain access to the network until a subsequent network unlock signal is issued by the transmitting node. This prevents other nodes on the network from possibly interfering with and/or effecting the calibration results experienced by the receiving node.

In step 210, node 100 from FIG. 2 receives the calibration data packet transmitted by node 130 in step 200.

In Step 220 the node ID within the calibration data packet is read by node 100, and the calibration data packet is transferred to processor 110.

In step 230, the calibration data packet is analyzed to determine what the optimal calibration value to be associated with the node ID of the transmitting node should be.

In step 240, a decision is made if the is still room to improve the performance of the communication link between node 100 and node 130.

If there is room to improve the performance of the communication link between node 100 and node 130, the method branches to step 260. Step 260 calculates new receiving parameters for the transceiver, which are written to the transceiver 100 at step 270. The method then branches from step 270 to step 210 to again receive a calibration data packet. Once the calibration data packet is again received, the process for determining the optimal parameters is repeated until the optimal parameters are determined.

If the calibration data packet analyzed in step 230 is determined to be optimal with no further changes to the transceiver at node 100 needed, the method branches to step 280.

Step 280 determines if other nodes need to be calibrated for transceiving data with node 100. If other nodes do need to be calibrated for communication with node 100, the program branches to step 290. In step 290, a signal is transmitted over the network to node 130 indicating that the calibration process for that node has been completed. In addition, step 290 also issues a network unlock signal. The network unlock signal allows other nodes on the network to begin their calibration process.

If a determination is made at step 280 that all the nodes within the network, based on node IDs, have been calibrated, the subroutine branches to step 300. Step 300 ends the calibration subroutine.

Although the present invention is described with reference to embodiments of calibrating a home or small business LAN using transmission lines, the principles of the present invention are equally applicable to calibrating a LAN using wireless transceivers.

Although the present invention is described with reference to embodiments of calibrating each node within a network for a home or a small business, the principles of the present invention are equally applicable to determining a calibration value between any two nodes within a network and transmitting the calibration value to the other nodes within the network.

Moreover, while the disclosed embodiments relate to HomePNA systems, the principles have equal applicability to Ethernet based systems and packet based applications in general.

While the invention has been described with reference to the exemplary embodiments thereof, those skilled in the art will be able to make various modifications to the described embodiments of the invention without departing from the true spirit and scope of the invention.

What is claimed is:

1. A self calibrating network having a plurality of nodes, comprising:

a first node of said plurality of nodes to transmit a test signal and a network lock command, said network lock command ceasing nodes other than said first node and a second node of said plurality of nodes from communicating on said network; and said second node to receive said test signal and to adjust a second node transceiver to optimize a transfer of data between said first node and said second node, said adjustment of said second node transceiver i) being based on at least one of available criteria comprising a noise measurement value, a propagation delay value, and a bit error value and ii) occurring until receipt of a network unlock command;

wherein said network lock command prevents other nodes on said network other than said first node and said second node from affecting a calibration result experienced by said second node and wherein said unlock command on said network permits all nodes on said network to again begin communication; and wherein said first node transmits said test signal and said network lock command for subsequent nodes of said self calibrating network, each of said subsequent nodes adjusting said subsequent node transceiver to optimize said transfer of data between said first node and said subsequent node until receipt of a network unlock command.

2. The self calibrating network according to claim 1, wherein:
one of said first nodes an4 said second node, and said subsequent node issues said unlock command on said network.

3. A method for self-calibrating a network having a plurality of nodes, comprising:
transmitting a test signal and a network lock command from a first node of said plurality of nodes, said network lock command ceasing nodes other than said first node and a second node of said plurality of nodes from communicating on said network; and
receiving said test signal by said second node; and
adjusting, until receipt of a network unlock command, a second node transceiver to optimize a transfer of data between said first node and said second node, said adjustment of said second node transceiver being based on at least one of available criteria comprising a noise measurement value, a propagation delay value, and a bit error value;
wherein said network lock command prevents other nodes on said network other than said first node and said second node from affecting a calibration result experienced by said second node, and wherein said unlock command on said network permits all nodes on said network to again begin communication; and
transmitting, by said first node, said test signal and said network lock command for subsequent nodes of said self calibrating network; and
adjusting, by each of said subsequent nodes, said subsequent node transceiver to optimize said transfer of data between said first node and said subsequent node until receipt of said network unlock command.

4. The method for self calibrating a network according to claim 3, further comprising:
issuing from one of said first node, and-said second node, and said subsequent node, an unlock command on said network.

5. A means for self-calibrating a network having a plurality of nodes, comprising:
a transmitter means for transmitting a test signal and a network lock command from a first node node of said plurality of nodes, said network lock command ceasing nodes other than said first node and a second node of said plurality of nodes from communicating on said network; and
receiver means for receiving said test signal by said second node; and
adjusting means for adjusting, until receipt of a network unlock command, a second node transceiver to optimize a transfer of data between said first node and said second node, said adjustment of said second node transceiver being based on at least one of available criteria comprising a noise measurement value, a propagation delay value, and a bit error value;
wherein said network lock command prevents other nodes on said network other than said first node and said second node from affecting a calibration result experienced by said second node, and wherein said unlock command on said network permits all nodes on said network to again begin communication; and,
said first node transmitter means transmits said test signal and said network lock command for subsequent nodes of said self calibrating network; and
each of said subsequent nodes comprises corresponding receiving means for receiving said test signal by said subsequent node and corresponding adjusting means for adjusting said subsequent node transceiver to optimize said transfer of data between said first node and said subsequent node until receipt of said network unlock command.

6. The means for self calibrating a network according to claim 5, further comprising:
issue means for issuing from one of said first node, said second node, and said subsequent node an unlock command on said network.

* * * * *